US009483672B2

(12) United States Patent
Pantaloni

(10) Patent No.: US 9,483,672 B2
(45) Date of Patent: Nov. 1, 2016

(54) CONVEYOR SYSTEM FOR IDENTIFYING RFID TAGS ON PARCELS

(71) Applicant: NEOPOST TECHNOLOGIES, Bagneux (FR)

(72) Inventor: Jean-Baptiste Pantaloni, Ucciani (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 30 days.

(21) Appl. No.: 14/552,653

(22) Filed: Nov. 25, 2014

(65) Prior Publication Data

US 2015/0154428 A1  Jun. 4, 2015

(30) Foreign Application Priority Data

Nov. 29, 2013 (EP) ..................................... 13306637

(51) Int. Cl.
*H04Q 5/22* (2006.01)
*G06K 7/10* (2006.01)
(Continued)

(52) U.S. Cl.
CPC ....... *G06K 7/10316* (2013.01); *G06K 7/10178* (2013.01); *G06K 7/10435* (2013.01); *G06K 7/10445* (2013.01); *H01Q 1/2216* (2013.01); *H01Q 7/00* (2013.01)

(58) Field of Classification Search
CPC ...... G08G 1/042; G08G 1/015; G08G 1/017; G08G 1/0104; G08G 1/096716; G08G 1/096783; G08G 1/08; G08G 1/096758; G08G 1/01; G08G 1/07; G08G 1/087; G08G 5/0026; G06K 17/00; G06K 2017/0045; G06K 19/07749; G06K 7/10306; G06K 19/041; G06K 19/0723; G06K 19/07716; G06K 2017/0041; G06K 7/10178; G06K 7/10316; G06K 7/10435; G06K 7/10445; G06K 19/0705; G06K 19/0707; G06K 19/07758; G06K 2017/0048; G06Q 20/203; G06Q 10/08; G06Q 10/087; G06Q 50/30; Y10T 436/13; Y10T 428/13; Y10T 428/24; B65C 11/006; B65C 2009/0003; B65C 2009/404; B65C 9/1865; H01Q 7/00; B65D 2203/10; B65D 23/14
USPC .......... 340/10.1–10.6, 573.1–573.8; 343/788
See application file for complete search history.

(56) References Cited

U.S. PATENT DOCUMENTS

| 4,854,446 A | * | 8/1989 | Strader | .................. B65G 43/02 198/810.02 |
| 5,929,760 A | * | 7/1999 | Monahan | ........... G06K 7/10316 340/572.1 |

(Continued)

FOREIGN PATENT DOCUMENTS

| JP | 2008-078930 A | 4/2008 |
| WO | 93/11504 A1 | 6/1993 |
| WO | 99/21144 A1 | 4/1999 |

OTHER PUBLICATIONS

European Search Report of EP 13 30 6637 dated Apr. 23, 2014.

*Primary Examiner* — Emily C Terrell
(74) *Attorney, Agent, or Firm* — Seed IP Law Group LLP

(57) ABSTRACT

A conveyor system for identifying an object (16) on which an identification tag (26) is affixed, comprising a conveyor frame (12) for supporting between its two opposite sides (12A, 12B) a plurality of transverse conveyor rollers (14) each having a roller shaft (14A) and an RFID interrogator exciting a radiant antenna for reading information from the identification tag, the radiant antenna being a first magnetic loop (22) formed by the conveyor frame and two adjacent roller shafts and excited by an excitation circuit (18) connected to, but distinct from, said RFID interrogator.

20 Claims, 2 Drawing Sheets

(51) Int. Cl.
*H01Q 1/22* (2006.01)
*H01Q 7/00* (2006.01)

(56) References Cited

U.S. PATENT DOCUMENTS

| | | | | |
|---|---|---|---|---|
| 6,107,921 | A * | 8/2000 | Eberhardt | G06K 7/0008 340/572.1 |
| 7,132,943 | B2 * | 11/2006 | Nelson | F41H 11/12 324/233 |
| 7,275,637 | B2 * | 10/2007 | Brown | G01N 27/83 198/502.1 |
| 7,345,635 | B2 * | 3/2008 | Hohler | G06K 7/10336 340/572.7 |
| 7,492,259 | B2 * | 2/2009 | Cox | B07C 5/3412 340/572.1 |
| 7,589,617 | B2 * | 9/2009 | McQuade | B65B 11/02 235/385 |
| 8,662,290 | B2 * | 3/2014 | Twigger | B65G 43/06 198/810.01 |
| 2002/0044096 | A1 * | 4/2002 | Chung | G06K 7/10336 343/742 |
| 2005/0212673 | A1 * | 9/2005 | Forster | G06K 7/0008 340/572.7 |
| 2007/0221727 | A1 * | 9/2007 | Reznik | G06Q 10/08 235/383 |
| 2008/0150691 | A1 | 6/2008 | Knadle et al. | |
| 2008/0238685 | A1 * | 10/2008 | Tuttle | G01S 7/024 340/572.7 |
| 2010/0277386 | A1 * | 11/2010 | Iliev | G06K 19/07749 343/788 |
| 2012/0098643 | A1 * | 4/2012 | Gunther | G06K 7/10435 340/10.1 |
| 2012/0326842 | A1 * | 12/2012 | Grinberg | G06K 7/10178 340/10.1 |

* cited by examiner

CONVEYOR SYSTEM FOR IDENTIFYING RFID TAGS ON PARCELS

FIELD OF THE INVENTION

The present invention relates to the identification of objects e.g. parcels placed upon a conveyor and more particularly to a conveyor adapted to read identification tags secured to such objects.

PRIOR ART

Conveying systems usually require identifying conveyed objects (e.g. parcels). A widespread identification solution is to use the UHF RFID technology. RFID tags are placed on the objects conveyed to identify. These tags are detected and read by RFID UHF antennas systems positioned along the conveyor. Indeed, the UHF RFID technology is able to detect the RFID tag in the RFID UHF antenna coverage area. However, systems that use standard UHF RFID antennas have problems from the reading area (area of radiation of the antenna) that is generally too large and rebounds (reflections, diffraction . . . ) on the conveyor or on external elements that enter the reading field.

These problems lead to detection errors. Rebounding leads in particular to the detection of objects conveyed outside the reading area. It is then necessary to space the objects conveyed, which penalizes the production flow. To overcome these problems, it is known to use a tunnel or even use HF magnetic antennas.

A tunnel works typically with 2 or 4 radiating antennas which can be installed between the rollers of the conveyor or directly above the conveyor elements. It allows limiting the spatial spread of the influence of standard RFID antennas which are typically little directives (blocking/sequestration of radiation by Faraday Effect). Without tunnel, the spread of radiation and its rebounds may lead to detect tagged objects distant from the conveyor.

However, leaks of radiation remain nevertheless by the entrance and the exit of the tunnel (certain specifications indicate areas of leakage up to 7 m). Because of these leaks, the reading area of the conveyor remains extended. In addition, the nature of convoyed objects can generate rebounds. Although the rebounds on external objects to the conveyor are avoided, there is uncertainty on the position of the objects, due to these leaks and rebounds; which requires maintaining a space between successive objects.

HF magnetic antennas are typically used in fairly complex conveyor systems. This antenna system generates and uses a nearby field to detect RFID tags, which avoids noise bounces. However, the weakness of the frequency (typically 13, 56 MHz) vis-à-vis the size of the antenna makes no radiating antenna effect. In addition, this frequency HF requires the use of higher cost HF (approx. ×4) specific RFID tags, because they must include more magnetic loops (inductance chip) and a magnetic loop antenna of large size with a diameter of several tens of cm.

OBJECT AND DEFINITION OF THE INVENTION

The object of the invention consists therefore in proposing a conveyor system that overcomes the above drawbacks and is actually improved over the current ones by minimizing the rebounds.

To this end, the invention provides a conveyor system for identifying an object on which an identification tag is affixed, comprising a conveyor frame for supporting between its two opposite sides a plurality of transverse conveyor rollers each having a roller shaft and an RFID interrogator exciting a radiant antenna for reading information from said identification tag, characterized in that said radiant antenna is a first magnetic loop formed by said conveyor frame and two adjacent roller shafts and excited by an excitation circuit connected to, but distinct from, said RFID interrogator.

With this configuration, the structure of the conveyor is not mechanically modified and only an excitation circuit is inserted between the rollers in contradistinction with the prior art devices using tunnels or UHF RFID technology.

According to a feature of the invention, said excitation circuit comprises a second magnetic loop located under said first magnetic loop and magnetically coupled with it. Advantageously, said second magnetic loop extends at least over the middle of said two adjacent roller shafts. Preferably, said second magnetic loop is located at half a wavelength of one side of said conveyor frame and when said second magnetic loop is constituted by micro-strip lines, the length end to end of these micro-strip lines being less than half a wavelength.

According to another feature of the invention, a gap between said two adjacent roller shafts is less than 8 cm and a conveyor width between said two opposite sides is less than 70 cm.

According to yet another feature of the invention, said excitation circuit comprises a conductive strand located under said first magnetic loop and magnetically coupled with it. Preferably, said conductive strand is located near one of the two sides of the conveyor frame, typically at a distance less than 2 cm from one side of the conveyor frame.

According to still another feature of the invention, a ground plate is located under said excitation circuit to direct the magnetic field to the conveyed object.

BRIEF DESCRIPTION OF THE DRAWINGS

Other aspects, features and advantages of the present teachings will become clearer to those ordinary skilled in the art upon review of the following description of a specific preferred embodiment of the invention in conjunction with the accompanying drawings where.

DETAILED DESCRIPTION OF EMBODIMENTS

The principle of the invention is to use a classical conveyor, the chassis and conveyor rollers of which are used as radiant antenna in a RFID interrogator for reading RFID tags affixed on objects conveyed by such conveyor. To do this, it is necessary to combine two adjacent rollers of the conveyor with an excitation system that can bring energy to the radiant antenna. The excitation system may be of magnetic type, i.e.

through the coupling of a magnetic loop, or of electric type, i.e. through the powering of a conductive element close to the antenna.

Figure 1:
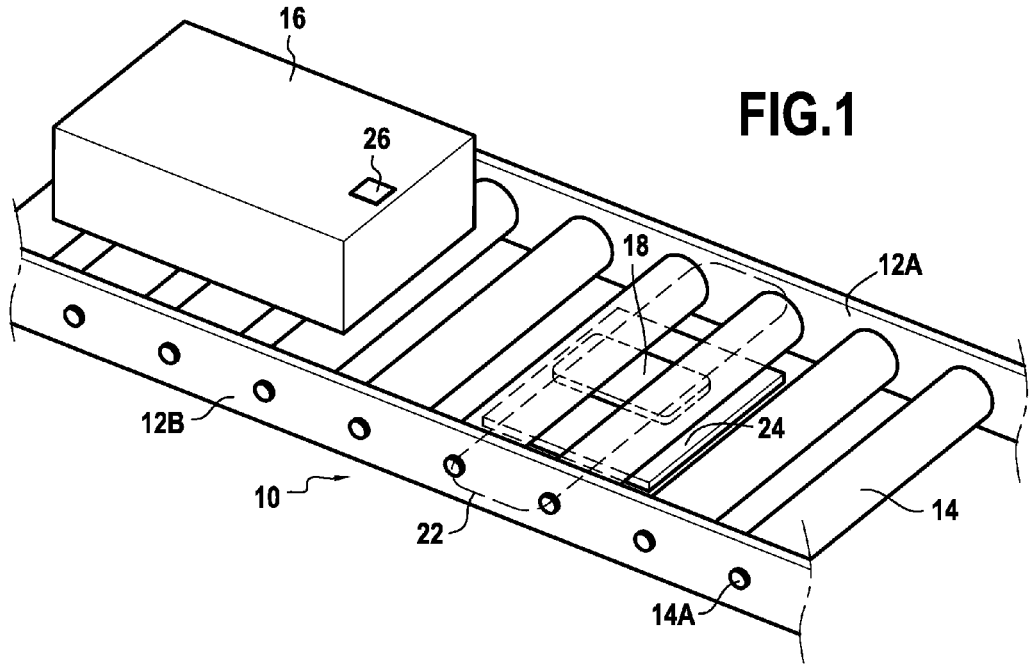
FIG. 1 shows a perspective view of a first embodiment of a conveyor used as an antenna in an interrogator for reading RFID tags according to the invention.
Figure 2:
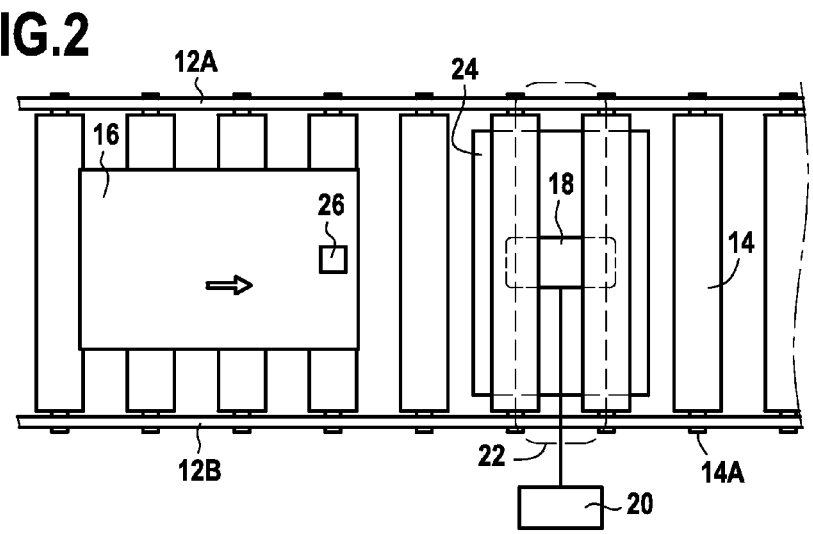
FIGS. 2 and 3 respectively show top and side views of the conveyor of FIG. 1.
Figure 3:
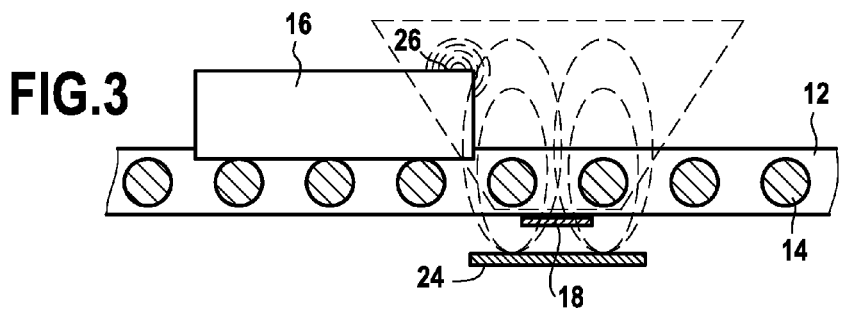

FIGS. 1 to 3 illustrate a first embodiment of a conveyor with a magnetic coupling system according to the invention. A conveyor 10 classically comprises a conveyor frame 12 for supporting between its two opposite sides 12A, 12B a plurality of transverse conveyor rollers 14 each having a roller shaft 14A. As well known in the art (and consequently not illustrated), the rollers can be driven by a chain, belt or motor or other drive means to move objects 16 along the conveyor path. Alternatively, the conveyor path can be inclined so that the force of gravity acting on the objects freely rotates the rollers.

According to the invention, a magnetic loop 18 is placed between two adjacent rollers of the conveyor, under the rollers and as close to the rollers as possible with the plane of the loop parallel to the plane formed by these two adjacent rollers (i.e. in terms of conveying). The loop is preferably located in the middle of the conveyor (i.e. centered compared to the adjacent rollers and the two sides of the frame). However, as an alternative, the center of the loop can be at a distance of half a wavelength of one of the two sides of the conveyor frame.

A RFID reader or interrogator 20 is connected with the magnetic loop 18 which generates a local magnetic field (typically limited to less than 10 cm). This evanescent magnetic radiation couples with the magnetic loop 22 constituted by the two adjacent rollers and the two sides of the conveyor frame and said magnetic loop 22 emits a radiation such as an antenna with a polarization parallel to the smaller dimension of the antenna that is parallel to the direction of movement of objects on the conveyor. To direct the magnetic field to the conveyed objects, a ground plate 24 is disposed under the magnetic loop 18. Radiation from the conveyor is emitted according to a cone (see FIG. 3) oriented perpendicular to the plane of the magnetic loop 22 and allows reading the objects equipped with a RFID tag 26 that is moved on the conveyor.

Figure 4:
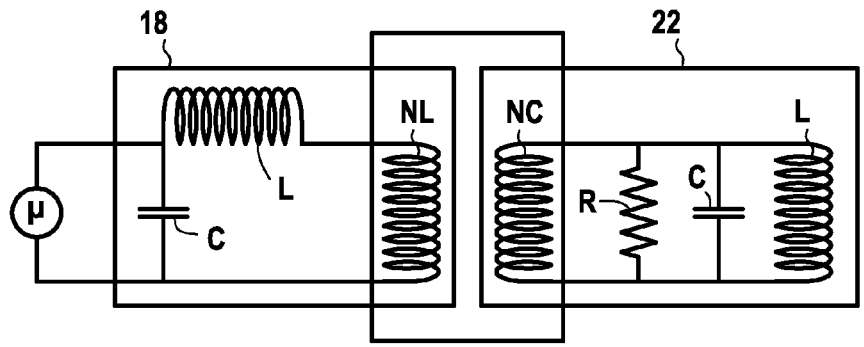
FIG. 4 is a corresponding electrical circuit of the interrogator of FIG. 1.

Indeed, as illustrated by the electrical equivalent circuit of FIG. 4, the first magnetic loop 22 formed by two adjacent rollers and the two sides of the conveyor frame allows efficient magnetic coupling with the second magnetic loop 18. This second magnetic loop is coupled by proximity to the conveyor structure which serves as radiant antenna (at 868 MHz, a loop more than 5 cm in circumference radiates).

The second magnetic loop 18 can be done with segments of micro-strip lines. When this loop presents a square or rectangular shape, the cumulative length of 4 sections of the line must be less than half a wavelength long. Obviously, the line impedance must be of 50 ohms (industrial standard) to ensure adaptation with the control electronics, particularly the RFID interrogator 20. For example, with a dashed line of micro-strip of apparent wavelength of 64 cm (at 868 MHz), the sum of the lengths of the loop must be less or equal to 34 cm. For a continuous line of micro-strip of apparent wavelength of 34 cm (at 868 MHz), the sum of the lengths of the loop must be less or equal 17 cm.

Of course, the shape of the loop can be other than square or rectangular and circular or oblong forms are also possible. The important point is that the largest dimension of the loop is slightly larger than the space between two adjacent rollers of the conveyor. Indeed, as illustrated, a partial recovery guarantees a good coupling between the two magnetic loops 18, 22. Moreover, it is preferable that the second magnetic loop 18 extends at least over the middle of the conveyor rollers (i.e. over the roller shaft 14A). Indeed, if it is not the case, the magnetic field curls and the energy radiation is not emitted.

For example, for rollers of 5 cm in diameter and spaced 6 cm, the dimensions of a rectangular loop can be 11 cm long by 6 cm wide. Typically, the dimensions of such loops are of the order of a few cm to 10 cm. Moreover, it is better to have a gap between rollers less than 8 cm (=<lambda/4). Thus, the predictability of the radiation is better (spatial stability of the direction of the polarization). However, a higher gap is also conceivable.

A less than 70 cm conveyor width is best. Beyond, the signal attenuation due to losses in the magnetic loop 22 may be important and may require a costly implementation to compensate for the reduction of intrinsic performance of the system. In addition, the predictability of the radiation is better for a conveyor width less than 70 cm. However, a higher conveyor width is also conceivable.

To be read by the RFID interrogator 20, it is better that the RFID tags are affixed to the objects with a preferred orientation. More particularly, passive RFID tags 26 must be oriented parallel to the axis of polarization of radiation of the radiant antenna in order to capture the energy radiated by the antenna in an optimal way.

However, the polarization of the field radiated by the antenna is mainly perpendicular to the plane of the radiant antenna and perpendicular to the large side of the radiant antenna. Passive RFID tags must therefore be oriented parallel to the plan of the conveyor rollers and perpendicular to the axis of the rollers, i.e. parallel to the direction of movement of the conveyor.

Nevertheless, as the orientation of the polarization varies by location of the cone of radiation and as a RFID tag can capture the energy of radiation's polarization inclined to the axis of the RFID tag, there is a tolerance on the orientation of the RFID tags for their detection (typically up to 70°).

The invention is therefore particularly suitable for semi-oriented conveyed objects and applies in particular for conveying system with internal semi-oriented boxes.

When objects are conveyed without guidance, it is however possible to ensure identification by placing three identical passive tags by conveyed object, two perpendicular tags on one side and one tag on a second face perpendicular to this one side. It is also possible to use special passive RFID tags accepting any direction. Indeed, there are 3D tags that have a rectangular shape to have a radiation pattern more or less spherical shaped.

Use of active RFID tags is also possible although more complex (the reading distances are of the order of 30 m to 120 m) and more expensive.

Figure 5:
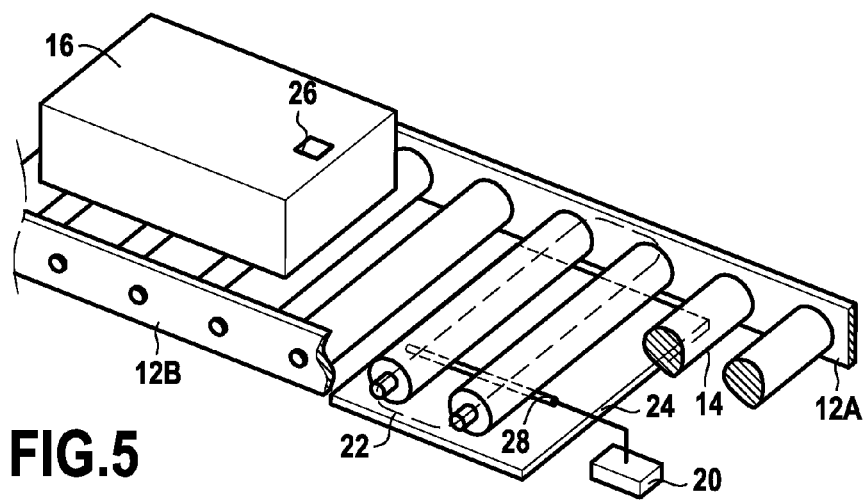
FIG. 5 shows a perspective view of a second embodiment of a conveyor used as an antenna in a RFID interrogator for reading RFID tags according to the invention.
Figure 6:
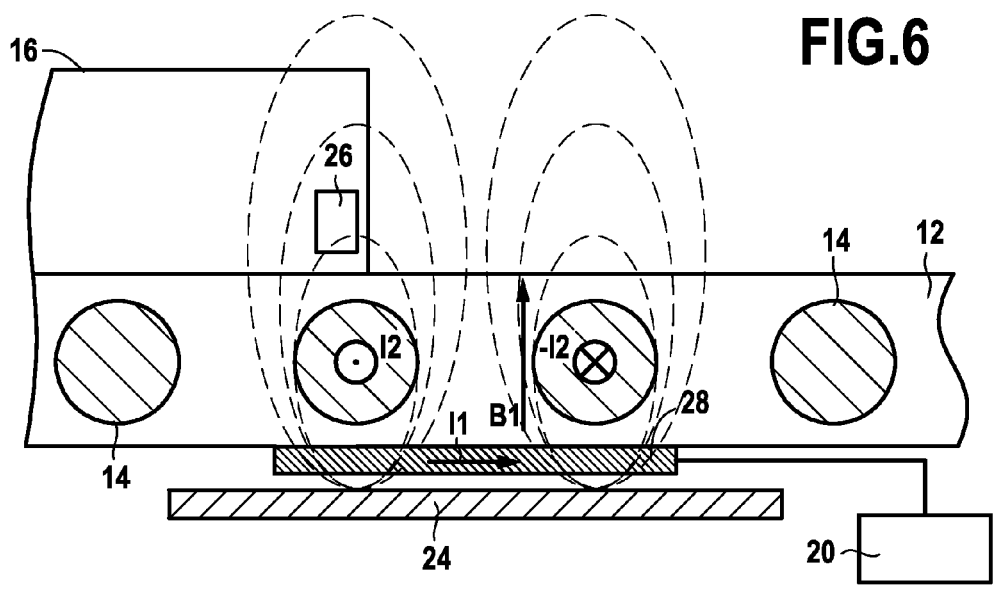
FIG. 6 is a side view of the conveyor of FIG. 5 showing magnetic flux and current acting on the radiant antenna of the conveyor.

FIGS. 5 and 6 show a second embodiment of the invention in which the excitation system is of electric type.

In FIG. 5, a conductive strand 28 located above and perpendicular to two adjacent rollers 14 is powered by the RFID interrogator 20. The conductive strand having a polygonal section (preferably circular or square) is preferably located near (at 1 or 2 cm) one of the two sides of the conveyor frame and, as in the previous configuration, the length of the strand should be slightly longer than the distance between two adjacent rollers of the conveyor in order to warranty a partial recovery with the magnetic loop 22. Moreover, it is preferable that the conductive strand 28 extends at least over the middle of the conveyor rollers. Naturally, the line impedance is adapted to be of 50 ohms (industrial standard) with a line termination that can be a short-circuit or an open circuit for example. The conveyor is connected to the mass or when present to the below ground plate 24.

Compared to the previous configuration, a conductive strand is simpler to implement than a magnetic loop and at a better cost. However, the energy radiated by such conductive strand is lower in comparison with the one radiated by a magnetic loop, which can be strengthened by increasing the number of loops.

The invention claimed is:

1. A conveyor system for identifying an object on which an identification tag is affixed, the conveyor system comprising:
a conveyor frame for supporting between the conveyor frame's two opposite sides a plurality of transverse conveyor rollers each having a roller shaft; and
an RFID interrogator for reading information from said identification tag, via a radiant antenna, wherein:
said RFID interrogator is electrically connected to an excitation circuit distinct from said RFID interrogator and from said radiant antenna, and
said excitation circuit is configured to excite a first magnetic loop formed by said conveyor frame and two adjacent roller shafts and constituting said radiant antenna.

2. The conveyor system according to claim 1, wherein said excitation circuit comprises a second magnetic loop located under said first magnetic loop and magnetically coupled with said first magnetic loop.

3. The conveyor system according to claim 2, wherein said second magnetic loop extends at least over the middle of said two adjacent roller shafts.

4. The conveyor system according to claim 2, wherein said second magnetic loop is located at half a wavelength of one side of said conveyor frame.

5. The conveyor system according to claim 2, wherein said second magnetic loop is constituted by micro-strip lines, the length end to end of these micro-strip lines being less than half a wavelength.

6. The conveyor system according to claim 1, wherein a gap between said two adjacent roller shafts is less than 8 cm and a conveyor width between said two opposite sides is less than 70 cm.

7. The conveyor system according to claim 1, wherein said excitation circuit comprises a conductive strand located under said first magnetic loop and magnetically coupled with said first magnetic loop.

8. The conveyor system according to claim 7, wherein said conductive strand is located near one of the two sides of the conveyor frame.

9. The conveyor system according to claim 8, wherein said conductive strand is located at a distance less than 2 cm from one side of the conveyor frame.

10. The conveyor system according to claim 2, further comprising a ground plate located under said excitation circuit to direct the magnetic field to the conveyed object.

11. The conveyor system according to claim 7, further comprising a ground plate located under said excitation circuit to direct the magnetic field to the conveyed object.

12. A method for identifying an object that a conveyor conveys, the conveyor including a conveyor frame having a first side and a second side opposite the first side, the conveyor frame supporting a plurality of transverse conveyor rollers between the first side and the second side, each of the plurality of transverse conveyor rollers having a respective roller shaft that is transverse to the first side and the second side, the plurality of transverse conveyor rollers including two successively adjacent conveyor rollers having respective first ends and second ends, the first respective ends of the two successively adjacent conveyor rollers separated by and coupled via at least a portion of the first side of the conveyor frame, the second respective ends of the two successively adjacent conveyor rollers separated by and coupled via at least a portion of the second side of the conveyor frame, the two successively adjacent conveyor rollers, at least the portion of the first side of the conveyor frame that separates and couples the two successively adjacent conveyor rollers, and at least the portion of the second side of the conveyor frame that separates and couples the two successively adjacent conveyor rollers constituting a loop, the method comprising:
positioning an antenna between or across the two successively adjacent conveyor rollers of the plurality of transverse conveyor rollers of the conveyor, the antenna having at least one dimension;
orienting a largest one of the at least one dimension of the antenna perpendicular to the two successively adjacent conveyor rollers;
exciting, by a radio frequency identification (RFID) interrogator distinct from the antenna and communicatively coupled to the antenna, the antenna;
responsive to excitation of the antenna by the RFID interrogator, emitting, by the antenna, radiation that magnetically couples the antenna with the loop constituted by the two successively adjacent conveyor rollers, at least the portion of the first side of the conveyor frame that separates and couples the two successively adjacent conveyor rollers, and at least the portion of the second side of the conveyor frame that separates and couples the two successively adjacent conveyor rollers; and
responsive to magnetic coupling of the antenna with the loop, emitting, by the loop, radiation that magnetically couples the loop with an RFID tag affixed to the object that the conveyor conveys.

13. The method according to claim 12, further comprising:
responsive to magnetic coupling of the loop with the RFID tag, receiving, by the loop, information from the RFID tag via the magnetic coupling of the loop with the RFID tag;
responsive to the information from the RFID tag, transmitting, by the loop, the information from the RFID tag to the antenna via the magnetic coupling of the antenna with the loop;
responsive to the information from the RFID tag, providing, by the antenna, the information from the RFID tag to the RFID interrogator; and
reading, by the RFID interrogator, the information from the RFID tag.

14. The method according to claim 13, further comprising:
disposing a ground plate under the antenna; and
responsive to the antenna emitting radiation, directing, by the ground plate, radiation to the RFID tag affixed to the object that the conveyor conveys.

15. The method according to claim 13 wherein the largest one of the at least one dimension of the antenna exceeds an entirety of a distance that separates the two successively adjacent conveyor rollers from each other.

16. The method according to claim 13 wherein positioning the antenna between or across the two successively adjacent conveyor rollers further includes positioning the antenna at a half wavelength from the first side of the conveyor frame, the half wavelength being half of a wavelength of the radiation that magnetically couples the antenna with the loop.

17. The method according to claim 13 wherein positioning the antenna between or across the two successively adjacent conveyor rollers further includes positioning the antenna within 2 centimeters from the first side of the conveyor frame.

18. The method according to claim 13 wherein positioning the antenna between or across the two successively adjacent conveyor rollers further includes positioning the antenna across at least over respective middles of the respective roller shafts of the two successively adjacent conveyor rollers.

19. The method according to claim 13 wherein the antenna comprises a magnetic loop.

20. The method according to claim 19 wherein the magnetic loop comprises micro-strip lines that have an end-to-end length of less than a half wavelength of the radiation that magnetically couples the antenna with the loop.

* * * * *